(12) United States Patent
Sanz Martinez et al.

(10) Patent No.: US 11,448,161 B2
(45) Date of Patent: Sep. 20, 2022

(54) ACOUSTIC FAIRING

(71) Applicant: ROHR, INC., Chula Vista, CA (US)

(72) Inventors: Pablo T. Sanz Martinez, San Diego, CA (US); Jose S. Alonso-Miralles, Chula Vista, CA (US); Bryce Tyler Kelford, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 297 days.

(21) Appl. No.: 16/126,716

(22) Filed: Sep. 10, 2018

(65) Prior Publication Data

US 2020/0080512 A1 Mar. 12, 2020

(51) Int. Cl.
| | |
|---|---|
| *F02K 1/44* | (2006.01) |
| *F02K 1/72* | (2006.01) |
| *F02K 3/06* | (2006.01) |
| *F02K 1/82* | (2006.01) |

(52) U.S. Cl.
CPC .............. *F02K 1/44* (2013.01); *F02K 1/72* (2013.01); *F02K 1/827* (2013.01); *F02K 3/06* (2013.01); *F05D 2220/323* (2013.01); *F05D 2230/60* (2013.01); *F05D 2240/14* (2013.01); *F05D 2260/96* (2013.01)

(58) Field of Classification Search
CPC ... F02K 1/827; F02K 1/44; F02K 1/64; F02K 1/72; F02K 1/74; F02K 1/76; F02K 1/763; F02K 1/766; F02K 1/70; F02K 1/54; F02K 1/56
See application file for complete search history.

(56) References Cited

U.S. PATENT DOCUMENTS

| | | | | |
|---|---|---|---|---|
| 5,806,302 A | * | 9/1998 | Cariola | .............. F02K 1/09 239/265.29 |
| 5,975,237 A | * | 11/1999 | Welch | .............. B64D 33/06 181/213 |
| 6,557,799 B1 | | 5/2003 | Sternberger | |
| 8,739,552 B2 | | 6/2014 | Vauchel et al. | |
| 9,725,183 B2 | | 8/2017 | Aten | |
| 2002/0006078 A1 | * | 1/2002 | Battini | .............. B64D 29/00 367/1 |
| 2006/0145001 A1 | * | 7/2006 | Smith | .............. B64D 29/08 244/11 OB |
| 2007/0234707 A1 | * | 10/2007 | Beardsley | .............. F02K 1/72 60/226.2 |
| 2011/0318173 A1 | * | 12/2011 | Ramlaoui | .............. B64D 33/04 415/182.1 |

(Continued)

FOREIGN PATENT DOCUMENTS

EP 2863039 4/2015

OTHER PUBLICATIONS

European Patent Office, European Search Report dated Jan. 22, 2020 in Application No. 19195433.8.

*Primary Examiner* — Thomas P Burke
(74) *Attorney, Agent, or Firm* — Snell & Wilmer L.L.P.

(57) ABSTRACT

A thrust reverser arrangement may comprise an inner fixed structure (IFS), a track beam, a translating sleeve slideably mounted to the track beam, a bypass duct defined between the IFS and the translating sleeve, and an acoustic treated fairing coupled to the translating sleeve, wherein the acoustic treated fairing is configured to attenuate noise generated during operation of a gas turbine engine.

17 Claims, 7 Drawing Sheets

A-A (56) References Cited

U.S. PATENT DOCUMENTS

| | | | |
|---|---|---|---|
| 2012/0171023 A1* | 7/2012 | Albers | F01D 25/243 |
| | | | 415/173.1 |
| 2016/0160796 A1 | 6/2016 | Dussol et al. | |
| 2016/0368615 A1* | 12/2016 | Alonso-Miralles | B64D 33/06 |
| 2017/0184023 A1* | 6/2017 | Desjoyeaux | F02K 3/06 |
| 2017/0328281 A1 | 11/2017 | Pretty et al. | |
| 2017/0363042 A1* | 12/2017 | Lu | F02C 7/045 |

* cited by examiner

ACOUSTIC FAIRING

FIELD

The present disclosure relates to turbine engine systems and, more specifically, to acoustic treatment for a thrust reverser assembly for a gas turbine engine.

BACKGROUND

Aircraft propulsion systems generate low and high frequency noise. There is a continued need in the art to decrease generation of such noise in order to reduce, among other things, noise disturbances near airports.

SUMMARY

A thrust reverser arrangement is disclosed, comprising an inner fixed structure (IFS), a track beam, a translating sleeve slideably mounted to the track beam, a bypass duct defined between the IFS and the translating sleeve, and an acoustic treated fairing coupled to the translating sleeve, wherein the acoustic treated fairing is configured to attenuate noise generated during operation of a gas turbine engine.

In various embodiments, the acoustic treated fairing is coupled to an inner panel of the translating sleeve.

In various embodiments, the acoustic treated fairing is coupled to the inner panel at a longitudinal edge of the inner panel.

In various embodiments, the thrust reverser arrangement further comprises a primary slider coupled to the translating sleeve whereby the translating sleeve is slideably mounted to the track beam.

In various embodiments, the acoustic treated fairing at least partially encloses the primary slider.

In various embodiments, the primary slider is coupled to the inner panel, the primary slider disposed between the inner panel and the acoustic treated fairing.

In various embodiments, the acoustic treated fairing comprises a permeable outer skin.

In various embodiments, the permeable outer skin is perforated at discrete locations along the acoustic treated fairing.

In various embodiments, a first longitudinal edge of the acoustic treated fairing terminates at the track beam and a second longitudinal edge of the fairing terminates at the inner panel.

In various embodiments, the acoustic treated fairing is spaced apart from the track beam.

In various embodiments, the thrust reverser arrangement further comprises a bracket coupled to the primary slider for attaching the acoustic treated fairing to the translating sleeve.

In various embodiments, the thrust reverser arrangement further comprises a threaded boss formed into the primary slider and extending therefrom, to provide a mounting location for attaching the acoustic treated fairing to the translating sleeve.

A nacelle for a gas turbine engine is disclosed, comprising an inlet, a fan cowl, and a thrust reverser comprising an inner fixed structure (IFS), a track beam, a translating sleeve slideably mounted to the track beam, a bypass duct defined between the IFS and the translating sleeve, and an acoustic treated fairing coupled to the translating sleeve, wherein the acoustic treated fairing is configured to attenuate noise generated during operation of the gas turbine engine.

In various embodiments, the acoustic treated fairing is coupled to an inner panel of the translating sleeve.

In various embodiments, the acoustic treated fairing is coupled to the inner panel at a longitudinal edge of the inner panel.

In various embodiments, the nacelle for a gas turbine engine further comprises a primary slider coupled to the translating sleeve whereby the translating sleeve is slideably mounted to the track beam, wherein the acoustic treated fairing at least partially encloses the primary slider, and the primary slider is disposed between the inner panel and the acoustic treated fairing.

In various embodiments, the nacelle for a gas turbine engine further comprises a bracket coupled to the primary slider for attaching the acoustic treated fairing to the translating sleeve.

In various embodiments, the nacelle for a gas turbine engine further comprises a threaded boss formed into the primary slider and extending therefrom, to provide a mounting location for attaching the acoustic treated fairing to the translating sleeve.

A method for manufacturing a thrust reverser arrangement is disclosed, comprising coupling a primary slider to an inner panel of a translating sleeve, coupling an acoustic treated fairing to the primary slider, and coupling the primary slider to a track beam, wherein the acoustic treated fairing at least partially encloses the primary slider.

In various embodiments, the method further comprises coupling a bracket to the primary slider, and coupling the acoustic treated fairing to the bracket.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
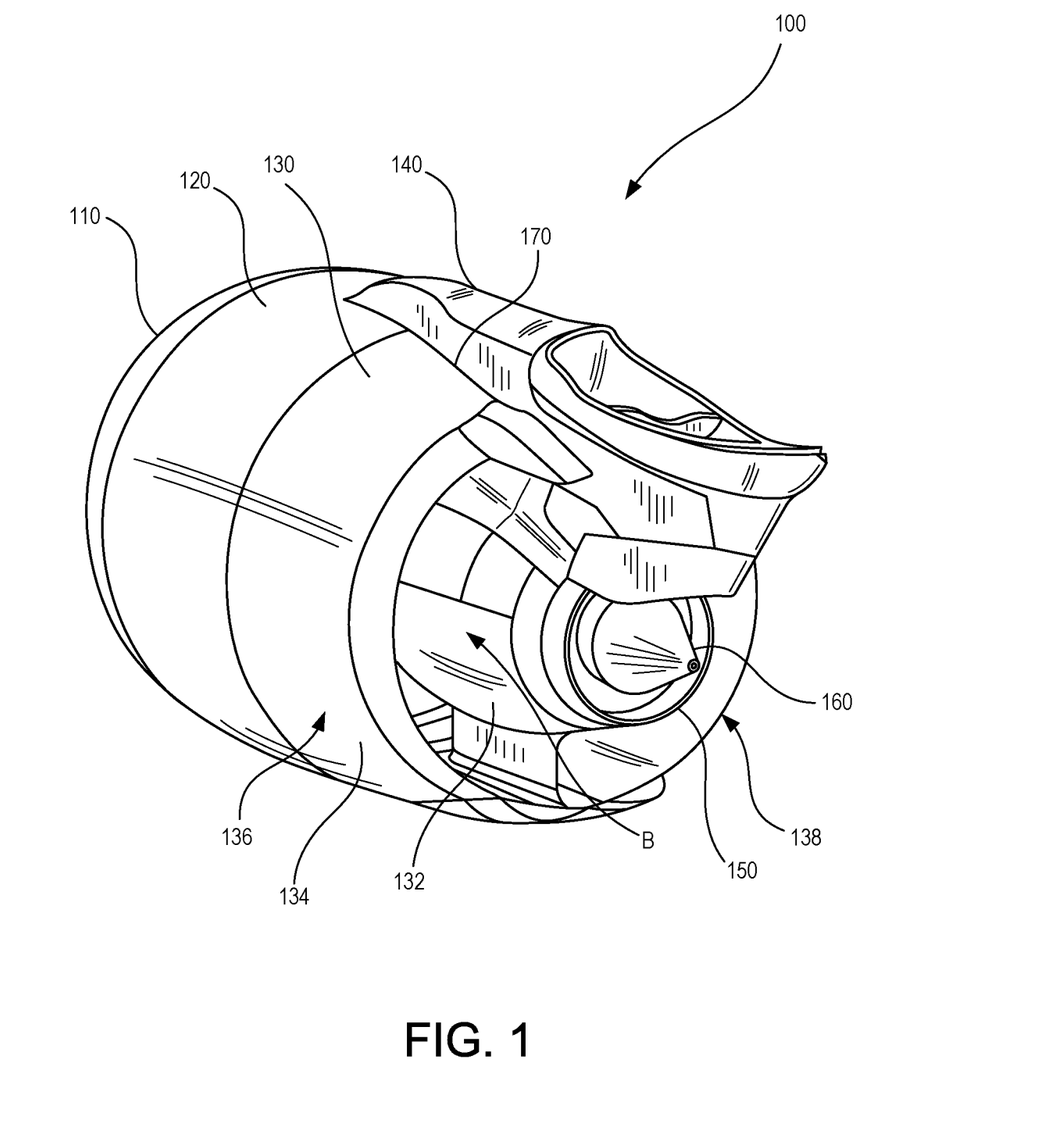
FIG. 1 illustrates a perspective view of a nacelle, in accordance with various embodiments.

With reference to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132 and a translating sleeve 134. Bypass air from an engine fan may flow between the IFS 132 and the translating sleeve 134 in a bypass air duct B, and exits the duct at a nozzle formed generally between the IFS and OFS to provide the majority of the thrust. Nozzle 150 may surround a centerbody 160, between which the engine exhaust stream exits to provide additional thrust. The thrust reverser 130 may further be split into a left half 136 and a right half 138. The left half 136 and the right half 138 may be hinged to the pylon 140 at hinges 170. The left half 136 and the right half 138 may hinge open at hinges 170 in order to provide access to the engine.

Figure 2:
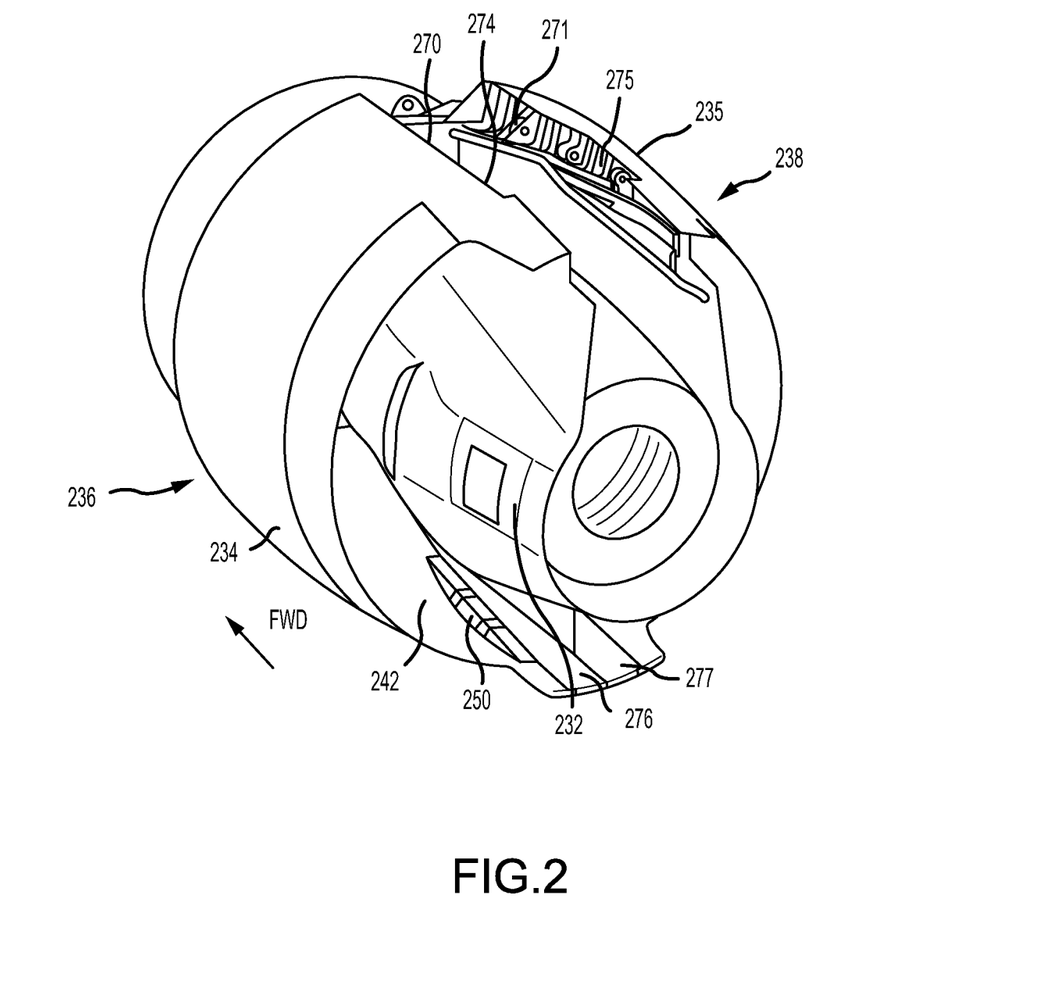
FIG. 2 illustrates a perspective view of a thrust reverser assembly with an acoustic fairing coupled to an inner surface of a translating sleeve at a latch beam, in accordance with various embodiments.

With reference to FIG. 2, a thrust reverser 200 for a gas turbine engine is illustrated, in accordance with various embodiments. Thrust reverser 200 may be similar to thrust reverser 130 with momentary reference to FIG. 1. Thrust reverser 200 may comprise IFS 232 and translating sleeve 234. The thrust reverser 200 may further be split into a left half 236 and a right half 238. The left half 236 and the right half 238 may be hinged to a pylon (e.g., pylon 140 of FIG. 1) at hinges 270 and hinges 271, respectively. The left half 236 and the right half 238 may hinge open at hinges 270 and hinges 271, respectively, in order to provide access to the engine.

In various embodiments, thrust reverser 200 may be configured to direct the flow of bypass air in a forward direction, causing reverse thrust. In this regard, translating sleeve 234 may be configured to translate forward and aft (e.g., to stow and deploy), in a known manner. The translating sleeve 234 may be configured to translate forward and aft adjacent to at least one of a hinge beam 274 (e.g., the upper track beam) and a latch beam 276 (e.g., the lower track beam). Accordingly, hinge beam 274 and latch beam 276 may be referred to herein collectively as track beams and/or a track beam. Translating sleeve 235 of right half 238 may similarly be configured to translate forward and aft adjacent to hinge beam 275 and latch beam 277.

Thrust reverser 200 may include a fairing (also referred to herein as an acoustic treated fairing) 250. Fairing 250 may be coupled to an inner panel 242 of translating sleeve 234. Fairing 250 may be coupled to inner panel 242 at an interface between translating sleeve 234 and latch beam 276. Fairing 250 may be configured to suppress resonating frequency bandwidths for noise attenuation of the gas turbine engine during operation. In various embodiments, fairing 250 may mitigate fan noise.

Figure 3A:
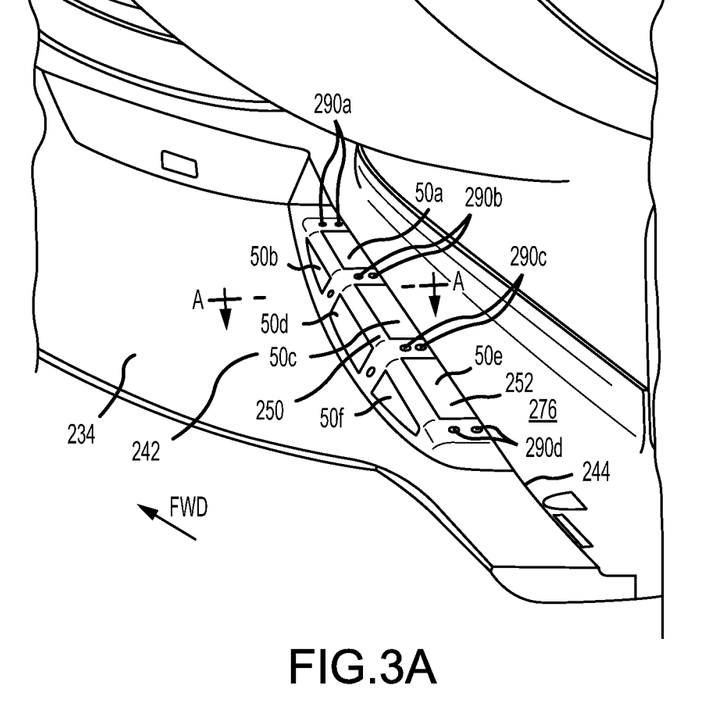
FIG. 3A illustrates an enlarged perspective view of the thrust reverser assembly of FIG. 2 with an acoustic fairing coupled to an inner surface of a translating sleeve, in accordance with various embodiments.

With reference to FIG. 3A, an enlarged view of the fairing 250 is illustrated, in accordance with various embodiments. Fairing 250 may be coupled to inner panel 242 of translating sleeve at a longitudinal edge 244 of the inner panel 242. In this regard, fairing 250 may be configured to enclose at least a portion of a primary slider whereby the translating sleeve 234 is slideably coupled to latch beam 276.

Fairing 250 may be acoustically treated. In this regard, fairing 250 may comprise a permeable outer skin 252, permitting the passage of air therethrough. Permeable outer skin 252 may be perforated at discrete locations (e.g., locations 50a, 50b, 50c, 50d, 50e, 500 depending on the design of the fairing, the available space beneath the fairing for the acoustic related components, and the desired area of acoustic treatment. In various embodiments, areas of fairing 250 having non planar surfaces or insufficient space there beneath may forego acoustic treatment. For example, fairing 250 may be coupled to translating sleeve 234 via fasteners (e.g., fasteners 290a, 290b, 290c, 290d) around which permeable outer skin 252 may forego perforation. It should be understood that the exact locations of perforations through permeable outer skin 252 may vary depending on the design of the thrust reverser and that the location (e.g., locations 50a, 50b, 50c, 50d, 50e, 500 of the perforations of the present disclosure is not intended to be limited by the illustrated exemplary embodiment. For example, perforations may be provided along a continuous portion of fairing 250, in addition to having discrete perforated portions.

Figure 3B:
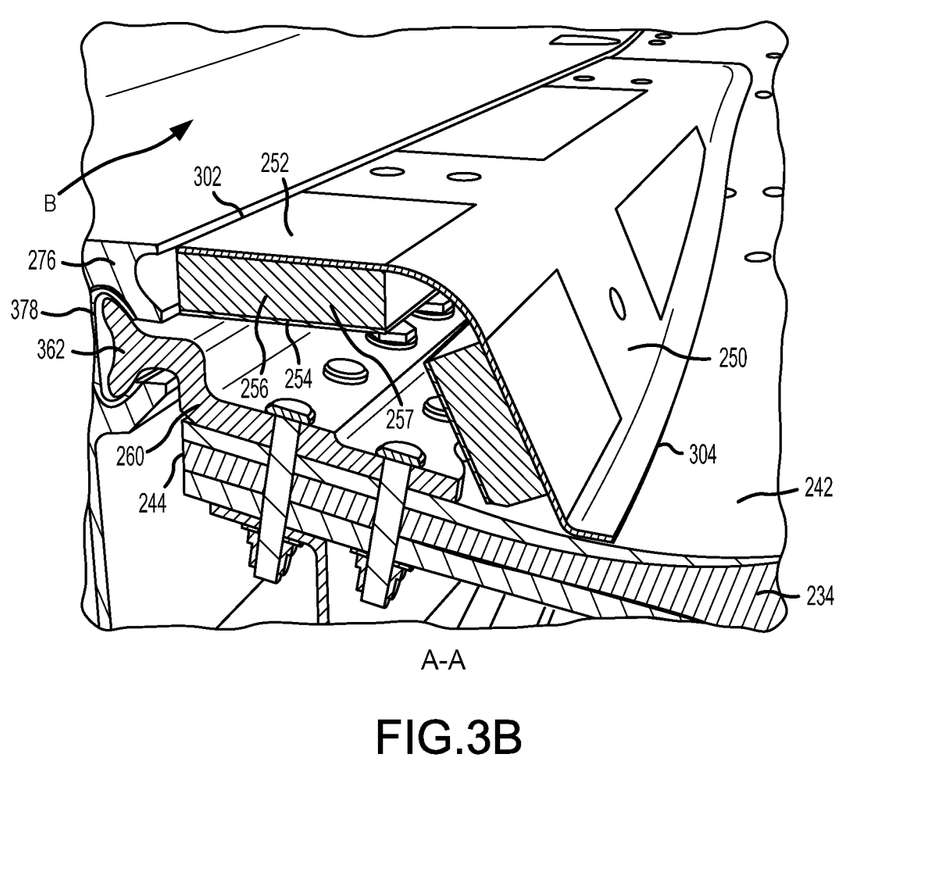
FIG. 3B illustrates a section view of the thrust reverser assembly of FIG. 3A, in accordance with various embodiments.

Referring to FIG. 3B, a section view of fairing 250 installed onto translating sleeve 234 is illustrated, in accordance with various embodiments. Fairing 250 may comprise a non-permeable back panel 254. In the illustrated embodiment, fairing 250 comprises a total of six non-permeable back panels; however, fairing 250 may comprise one or more non-permeable back panels, depending on the fairing design as discussed above. The non-permeable back panel 254 defines a chamber 256 disposed between the non-permeable back panel 254 and the permeable outer skin 252. Chamber 256 may be filled with a honeycomb core 257 connected between non-permeable back panel 254 and permeable outer skin 252. Honeycomb core 257 may include a plurality of resonating cavities. The honeycomb core 257 may have a height (i.e., the distance measured orthogonally between permeable outer skin 252 and non-permeable back panel 254) that tunes the resonating cavities to a specific target frequency of the noise to be attenuated. Chamber 256 may be configured as a single degree of freedom (SDOF) or double degree of freedom (DDOF), local reacting, liner.

In various embodiments, fairing 250 comprises a composite material, such as a carbon fiber composite and/or a glass fiber composite for example. In various embodiments, non-permeable back panel 254 may be bonded to permeable outer skin 252. In various embodiments, non-permeable back panel 254 may be co-cured with permeable outer skin 252 during a composite layup process. In various embodiments, fairing 250 comprises a metal material, such aluminum for example. In various embodiments, non-permeable back panel 254 may be coupled to permeable outer skin 252 via fasteners, such as bolts or rivets for example.

Translating sleeve 234 may include a primary slider 260 coupled along longitudinal edge 244. Primary slider 260 may physically engage latch beam 276 whereby translating sleeve 234 is secured to latch beam 276 and slides relative thereto. Primary slider 260 may comprise a channel bar 362 designed to slide freely in a slot 378 disposed in latch beam 276. Fairing 250 may enclose primary slider 260 and the related attachment features (e.g., fasteners) and provide an aerodynamic surface (i.e., permeable outer skin 252) for a flow of bypass air flowing through the bypass duct B. Thus, primary slider 260 may be disposed between inner panel 242 and fairing 250. In this regard, a first longitudinal edge 302 of the fairing 250 may terminate at latch beam 276 and a second longitudinal edge 304 of the fairing 250 may terminate at inner panel 242. However, first longitudinal edge 302 may avoid physical contact with latch beam 276 to allow movement of fairing 250 relative to the latch beam 276. Stated differently, fairing 250 may be separated from latch beam 276 by a gap. Stated still differently, fairing 250 may be spaced apart from latch beam 276.

Figure 4:
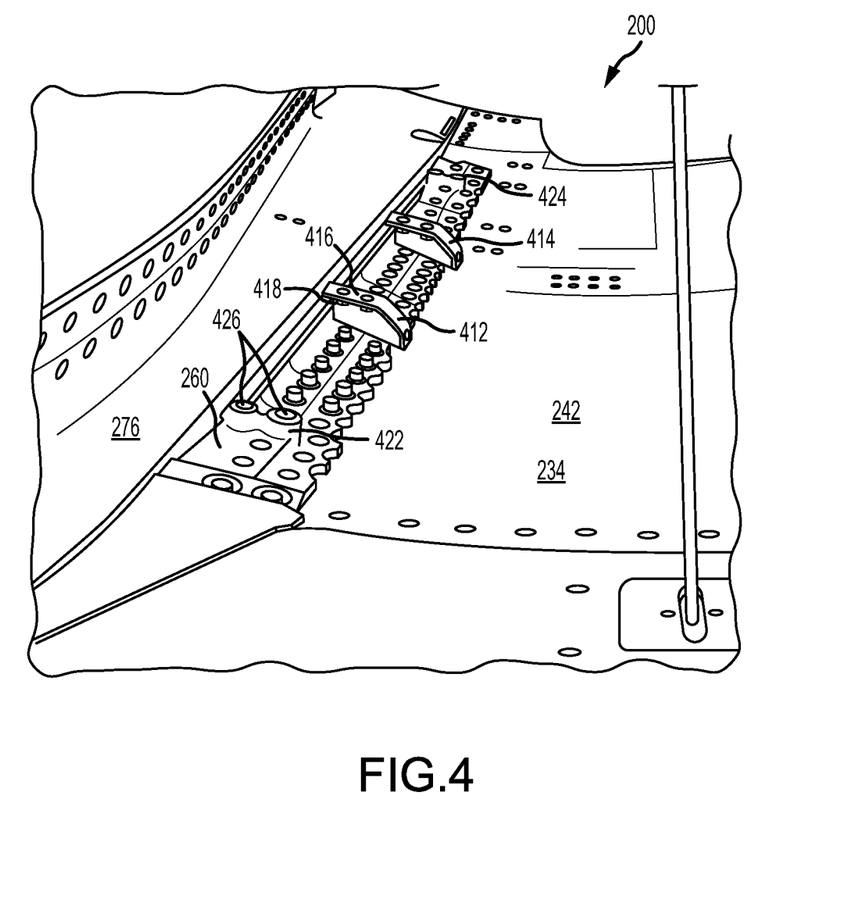
FIG. 4 illustrates a perspective view of a thrust reverser assembly with attachment features coupled to an inner surface of a translating sleeve for attachment of an acoustic fairing, in accordance with various embodiments.

Referring to FIG. 4, a portion of the thrust reverser 200 with the fairing omitted is illustrated, in accordance with various embodiments. With combined reference to FIG. 3B and FIG. 4, fairing 250 may be coupled to translating sleeve 234 via primary slider 260. In various embodiments, one or more brackets 412, 414 may be coupled to primary slider 260 for attaching fairing 250 to translating sleeve 234. In various embodiments, one or more threaded bosses 422, 424 may be formed into primary slider 260, and extend therefrom, to provide mounting locations for attaching fairing 250 to translating sleeve 234.

In various embodiments, threaded bosses 422, 424 may comprise spiral threaded inserts 426 embedded therein for receiving and securing fairing 250. A known system of such spiral threaded inserts 426 is offered on the market by the American company Emhart Teknologies under the trade name "Helicoil®." In various embodiments, brackets 412, 414 may comprise a nut plate 416 having nuts 418 coupled to the backside thereof for receiving a fastener—e.g., a bolt—whereby the fairing 250 is compressed against brackets 412, 414. Spiral threaded inserts 426 and nuts 418 may be replaced in the event of deterioration of the threads thereof. In this regard, nuts 418 and spiral threaded inserts 426 may be replaced in response to deterioration of the threads thereof without having to repair or replace primary slider 260 and/or latch beam 276.

Figure 5:
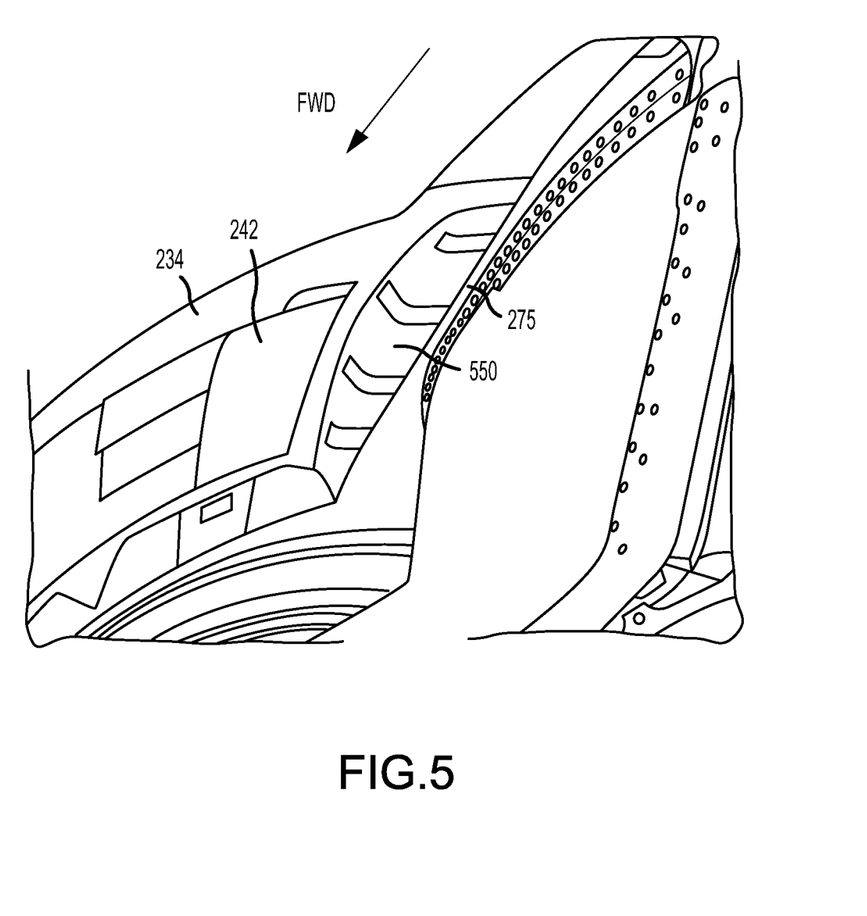
FIG. 5 illustrates a perspective view of a thrust reverser assembly with an acoustic fairing coupled to an inner surface of a translating sleeve at a hinge beam, in accordance with various embodiments.

Referring to FIG. 5, having described a fairing attached to a translating sleeve at a latch beam, a fairing 550 is illustrated coupled to translating sleeve 234 at hinge beam 275. Fairing 550 may be similar to fairing 250, except that fairing 550 is configured for attachment to translating sleeve 234 at hinge beam 275. In this regard, the teachings herein may be equally applied to a fairing for enclosing a primary slider engaged with a latch beam as well as for enclosing a primary slider engaged with a hinge beam. Fairing 550 may be attached to translating sleeve 234 in a similar manner as fairing 250 illustrated in FIG. 3B and/or FIG. 4, except that fairing 550 is attached to translating sleeve 234 at the hinge beam 275 instead of the latch beam 276.

Figure 6:
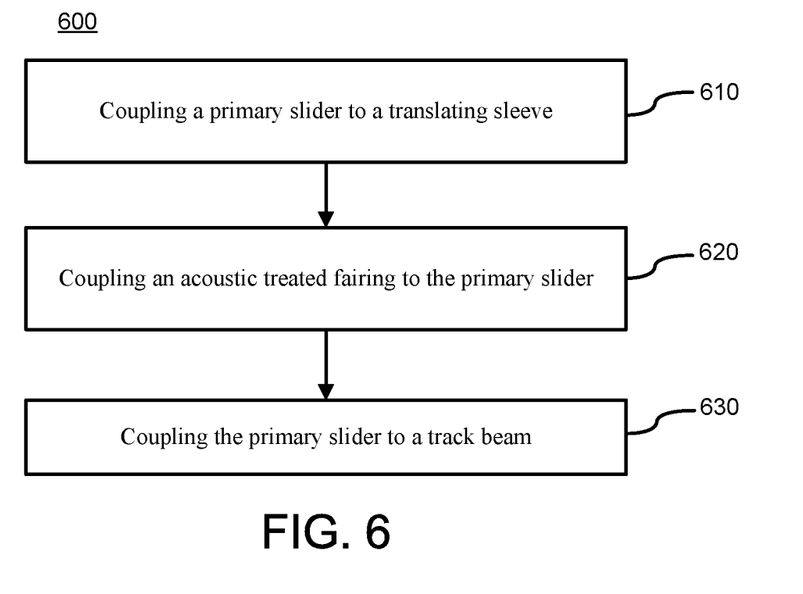
FIG. 6 illustrates a flow chart for a method for manufacturing a thrust reverser assembly, in accordance with various embodiments.
Figure 7:
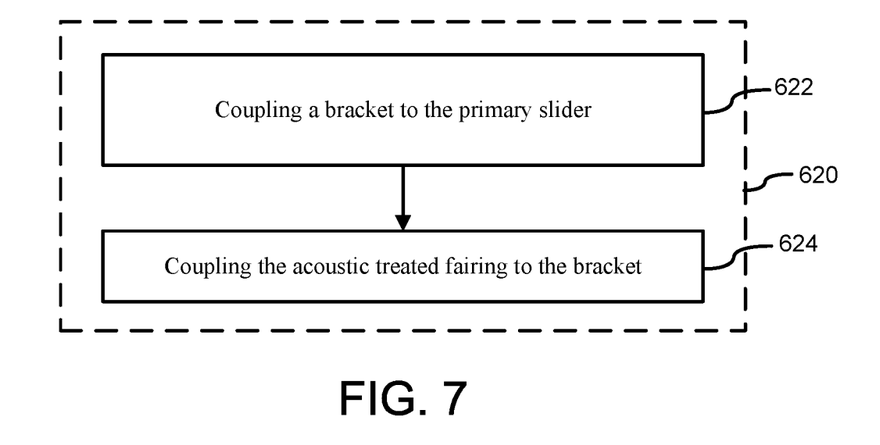
FIG. 7 illustrates a flow chart for a method for coupling an acoustic treated fairing to an acoustic slider, in accordance with various embodiments.

Referring to FIG. 6, a method 600 for manufacturing a thrust reverser arrangement is illustrated, in accordance with various embodiments. Method 600 includes coupling a primary slider to a translating sleeve (step 610). Method 600 includes coupling an acoustic treated fairing to the primary slider (step 620). Method 600 includes coupling the primary slider to a track beam (step 630). In various embodiments, with combined reference to FIG. 6 and FIG. 7, step 620 may include coupling a bracket to the primary slider (step 620) and coupling the acoustic treated fairing to the bracket (step 624).

Referring to FIG. 3B and FIG. 6, step 610 may include coupling primary slider 260 to translating sleeve 234. Step 610 may include coupling primary slider 260 to inner panel 242 of translating sleeve 234. Primary slider 260 may be bolted to translating sleeve 234. Step 620 may include coupling acoustic treated fairing 250 to primary slider 260. In various embodiments, step 620 may include coupling bracket 412 and/or bracket 414 to primary slider 260 (step 622) and coupling acoustic treated fairing 250 to bracket 412 and/or bracket 414 (step 624), with momentary reference to FIG. 4 and FIG. 7. In various embodiments, bracket 412 and/or bracket 414 may be bolted to primary slider 260. In various embodiments, acoustic treated fairing 250 may be bolted to bracket 412 and/or bracket 414. Step 630 may include coupling primary slider 260 to latch beam 276. Step 630 may include coupling primary slider 260 to hinge beam 275, with momentary reference to FIG. 5.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser arrangement comprising:
    an inner fixed structure (IFS);
    a track beam;
    a translating sleeve including a primary slider coupled to an inner panel of the translating sleeve, the primary slider being slidably mounted in a slot in the track beam;
    a bypass duct defined between the IFS and the translating sleeve; and
    an acoustic treated fairing coupled to the inner panel of the translating sleeve, wherein the acoustic treated fairing is disposed along a longitudinal edge portion of the inner panel, and wherein the acoustic treated fairing extends both radially inward from the inner panel and circumferentially toward the track beam and in the direction of a longitudinal edge of the translating sleeve in overlying relation to the inner panel so as to form a gap between the inner panel and the acoustic treated fairing, and also over the primary slider to enclose, at least partially, the primary slider, wherein the primary slider is disposed at least partially within the gap;
    wherein the acoustic treated fairing is configured to attenuate noise generated during operation of a gas turbine engine; and
    the acoustic treated fairing is configured to move together with the translating sleeve with respect to the track beam.

2. The thrust reverser arrangement of claim 1, wherein the primary slider is disposed radially between the inner panel and the acoustic treated fairing.

3. The thrust reverser arrangement of claim 1, wherein the acoustic treated fairing comprises a permeable outer skin.

4. The thrust reverser arrangement of claim 3, wherein the permeable outer skin is perforated at discrete locations along the acoustic treated fairing.

5. The thrust reverser arrangement of claim 1, wherein a first longitudinal edge of the acoustic treated fairing terminates at the track beam and a second longitudinal edge of the acoustic treated fairing terminates at the inner panel.

6. The thrust reverser arrangement of claim 1, wherein the acoustic treated fairing is spaced apart from the track beam.

7. The thrust reverser arrangement of claim 2, further comprising a bracket coupled to the primary slider, wherein the acoustic treated fairing is attached to the bracket.

8. The thrust reverser arrangement of claim 2, further comprising a threaded boss formed into the primary slider and extending therefrom, to provide a mounting location for attaching the acoustic treated fairing to the translating sleeve.

9. A nacelle for a gas turbine engine, comprising:
    an inlet;
    a fan cowl; and
    a thrust reverser, comprising:
        an inner fixed structure (IFS);
        a track beam;
        a translating sleeve including a primary slider coupled to an inner panel of the translating sleeve, the primary slider being slidably mounted in a slot in the track beam;
        a bypass duct defined between the IFS and the translating sleeve; and
        an acoustic treated fairing coupled to the inner panel of the translating sleeve,
    wherein the acoustic treated fairing is disposed along a longitudinal edge portion of the inner panel, and wherein the acoustic treated fairing extends both radially inward from the inner panel and circumferentially toward the track beam and in the direction of a longitudinal edge of the translating sleeve in overlying relation to the inner panel so as to form a gap between the inner panel and the acoustic treated fairing, and also over the primary slider to enclose, at least partially, the primary slider, wherein the primary slider is disposed at least partially within the gap;
    wherein the acoustic treated fairing is configured to attenuate noise generated during operation of the gas turbine engine; and
    the acoustic treated fairing is configured to move together with the translating sleeve with respect to the track beam.

10. The nacelle for a gas turbine engine of claim 9, wherein the primary slider is disposed radially between the inner panel and the acoustic treated fairing.

11. The nacelle for a gas turbine engine of claim 10, further comprising a bracket coupled to the primary slider, wherein the acoustic treated fairing is attached to the bracket.

12. The nacelle for a gas turbine engine of claim 10, further comprising a threaded boss formed into the primary slider and extending therefrom, to provide a mounting location for attaching the acoustic treated fairing to the translating sleeve.

13. The thrust reverser arrangement of claim 5, wherein the second longitudinal edge of the acoustic treated fairing is contiguous to the inner panel.

14. The thrust reverser arrangement of claim 1, wherein the acoustic treated fairing is coupled directly to a radially inward surface of the inner panel, the radially inward surface being oriented toward the IFS.

15. The thrust reverser arrangement of claim 1, wherein the acoustic treated fairing comprises a permeable outer skin, a non-permeable back panel, and a core comprising a plurality of resonating cavities disposed between the permeable outer skin and the non-permeable back panel, and wherein the non-permeable back panel and the core are located between the primary slider and the permeable outer skin.

16. The thrust reverser arrangement of claim 1, wherein the acoustic treated fairing comprises a permeable outer skin and a plurality of non-permeable back panels, the plurality of non-permeable back panels being located between the permeable outer skin and the primary slider, and wherein the acoustic treated fairing comprises a core comprising a plurality of resonating cavities disposed between the permeable outer skin and each of the non-permeable back panels of the plurality of non-permeable back panels.

17. The thrust reverser arrangement of claim 1, wherein at least one of:
  the primary slider is radially spaced apart from the acoustic treated fairing; or
  the inner panel is spaced apart from a circumferentially extending portion of the acoustic treated fairing.

* * * * *